United States Patent [19]
Westenrieder

[11] 3,920,036
[45] Nov. 18, 1975

[54] BALL VALVE

[75] Inventor: Georg Karl Westenrieder, South Holland, Ill.

[73] Assignee: Jacoby-Tarbox Corporation, Yonkers, N.Y.

[22] Filed: Dec. 10, 1973

[21] Appl. No.: 423,359

[52] U.S. Cl. ................ 137/315; 251/174; 251/315; 251/317
[51] Int. Cl.[2] ........................................... F16K 43/00
[58] Field of Search ........... 251/159, 162, 163, 171, 251/174, 315, 317, 170; 137/315, 312

[56] References Cited

UNITED STATES PATENTS

| | | | |
|---|---|---|---|
| 1,946,745 | 2/1934 | Johnston | 251/171 |
| 3,228,652 | 1/1966 | Antrim | 251/174 X |
| 3,288,430 | 11/1966 | Priese | 251/315 |
| 3,384,341 | 5/1968 | Ripert | 251/317 X |
| 3,592,440 | 7/1971 | McFarland | 251/174 X |
| 3,795,385 | 3/1974 | Westenrieder | 251/159 X |
| 3,838,844 | 10/1974 | Arn | 251/315 X |

FOREIGN PATENTS OR APPLICATIONS

| | | | |
|---|---|---|---|
| 403,389 | 12/1933 | United Kingdom | 251/174 |
| 781,655 | 8/1957 | United Kingdom | 251/174 |

*Primary Examiner*—Harold W. Weakley
*Attorney, Agent, or Firm*—Peck & Peck

[57] ABSTRACT

A ball valve having a pair of seat rings, of wedge shape cross section, to fit against and clampingly secure the ball therebetween. A pair of seat ring retainer means, having side walls inclined downwardly and inwardly, wedge the ball and seat rings therebetween. Spring means maintains a sufficient downward force directly on the seat rings to keep the ball, seat rings, seat ring retainer means, and body in tight engagement. Each seat ring includes an outer ring and an inner sealing ring. The inner ring has a slotted and tapered cross section portion which causes a spring action as the inner ring is forced deeply into a tapered recess formed in the outer ring, thereby compressing the legs formed at the slot closer together into a preloaded condition. Another feature of the invention is a combination drain plug and ball extractor associated with the body.

3 Claims, 4 Drawing Figures

BALL VALVE

BACKGROUND AND SUMMARY OF THE INVENTION

This invetion relates to ball valves, and more particularly to an improved ball valve having seat ring adjustment means associated therewith for compressing the seat rings between the ball and seat ring retainers.

The present invention is an improvement of the top entry ball valve disclosed in U.S. Patent Application Ser. No. 364,181, filed on May 25, 1973, and assigned to the same assignee as the present invention. The disclosure of this patent application is hereby incorporated by way of reference since certain objects, features, and advantages of the present invention are common to certain objects, features, and advantages disclosed in said patent application.

The ball valve of the type disclosed in U.S. Patent Application Ser. No. 364,181, utilizes a pair of seat rings, of wedge shape cross section, to fit against and clampingly secure the ball therebetween. A pair of seat ring retainer means, having side walls inclined downwardly and inwardly, wedge the ball and seat rings therebetween. The present invention provides uniquely positioned spring means to maintain a sufficient downward force directly on the seat rings to keep the ball, seat rings, seat ring retainer means, and body in tight engagement. Each seat ring, in accordance with the present invention, includes an outer ring and an inner sealing ring. The inner ring has a slotted and tapered cross section portion which causes a spring action as the inner ring is forced deeply into a tapered recess formed in the outer ring, thereby compressing the legs formed at the slot closer together. In this preloaded condition, the compressed legs tend to force the inner rings out of the recess and into tighter contact against the ball. A secondary spring may be inserted into the slot to provide for a stiffer and more durable spring action. An air pocket, formed behind the tapered portion as it is pushed into the recess, also results in a springing action. As pressure is applied to the inner ring by the ball, the air in this pocket will be compressed. As pressure is removed or decreased, the compressed air will expand and cause the inner ring to remain in contact with the ball. A seal between the outer ring and the body is accomplished by applying a relatively thin gasket tape to either the outer ring or the body. Another feature of the present invention is a combination drain plug and ball extractor associated with the body.

It is a primary object of the present invention to provide an improved ball valve assembly which automatically compensates for variation in manufacturing tolerances, seat wear and deformation, and lack of resiliency of the seat material.

Another object of the present invention is to provide a ball valve assembly having a valve seat with preloaded legs which are not in direct contact with the ball.

A further object is to provide a ball valve assembly having spring means which apply a force directly to the seat ring retainer means.

A still further object of the present invention is to provide a ball valve assembly having a combination drain plug and ball extractor.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF PREFERRED EMBODIMENTS

Figure 1:
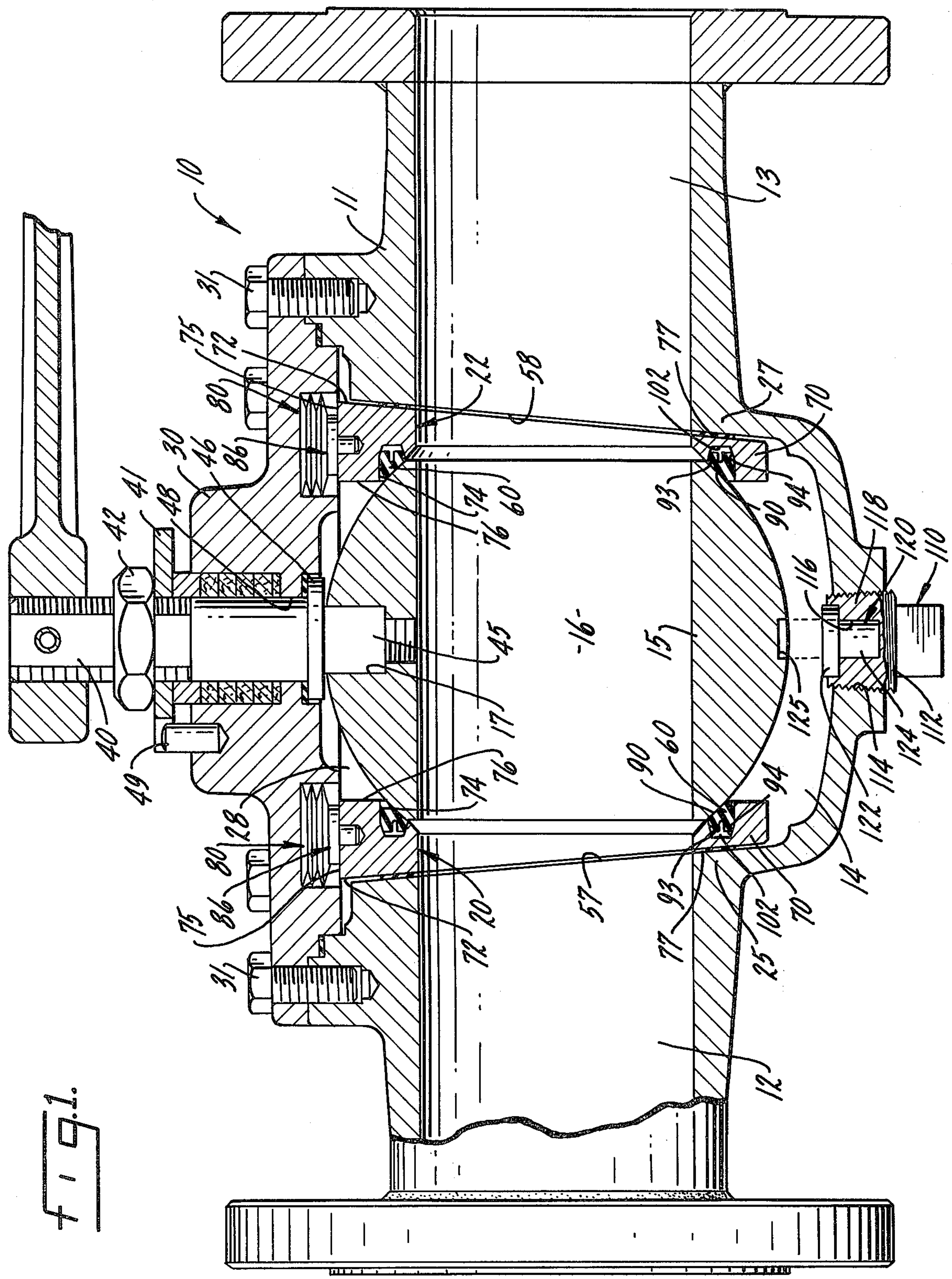
FIG. 1 is a sectional front elevational view of a ball valve constructed in accordance with the present invention taken substantially on its lognitudinal center line, with the ball in the position permitting fluid passage therethrough.

Referring to FIG. 1, the ball valve 10 of the present invention includes a tubular body 11 formed with an inlet passage 12 and an outlet passage 13 extending in axial alignment, one with the other. Body 11 is preferably pressure formed from one piece of tubular material to the shape as illustrated. Interposed between these passages is a central space 14 containing ball valve mbember 15. A flow passage 16 is formed in ball 15 to establish fluid flow between inlet passage 12 and outlet passage 13, when the valve is in an open position, as in FIG. 1. The remaining surface of ball 15 serves as a barrier wall of spherical form which prevents fluid flow between passages 12 and 13 when the valve is in its closed position.

Ball 15 is mounted between two wedge shaped seat rings 20 and 22, both of which are in turn supported by a pair of seat ring retainer means 25 and 27. Seat ring retainer means 25 and 27 are preferably formed integral with body 11 and are in fluid communication with passages 12 and 13 respectively. Retainer means 25 and 27 have side walls 57 and 58 respectively, inclined downwardly and inwardly approximately 5° from the vertical. Ball 15 and seat rings 20 and 22 are wedged between retaining means 25 and 27.

Body 11 has a lateral opening 28, through what may be considered the top of the body, through which ball valve member 15 and its associated seat rings 20 and 22 may be removed. Closing off opening 28 is a bonnet 30 which may be removably secured to valve body 11 in any conventional manner, i.e., by a series of cap screws 31. A stem 40, to which is suitably secured a stop plate 41 by way of a lock nut 42, has at its lower end a downwardly projecting lug 45 adapted to engage a shallow slot 17 in the top of ball 15. This stem and the interconnecting lug and slot constitute means for rotating ball 15 about a vertical axis. Stem 40 has an annular flange 46 at its lower end which is shaped to define the lug 45. The upper portion of stem 40 passes through a suitable cylindrical opening 48 in bonnet 30 having a diameter less than the diameter of flange 46. Bonnet 30 is provided with an upwardly extending follower 49 which is received by a quarter circle notch in the outer surface of stop plate 41, so as to limit rotation of stem 40 to 90°.

Seat rings 20 and 22 include an inner sealing ring 60 confined within an outer retaining ring 70. Outer ring 70, formed from a metallic material, has an inclined outer surface 72 positioned to contact surfaces 57 or 58 of retainer means 25 or 27. Inner ring 60, formed from a yieldable material, is received within an annualr recess 74 formed in inner surface 76 of ring 70. Inner rings 60 are positioned to contact ball 15 in a sealing relationship thereto. A seal between the seat rings 20 and 22 and the side walls 57 and 58 is accomplished by applying a relatively thin gasket tape 77 to either the retainer rings 20 and 22 or the surfaces 57 and 58 or both. This gasket may be made of TFE or other suitable materials depending upon the intended use of the valve. Gasket 77 serves to facilitate sliding of the seat rings 20 and 22 against the side walls 57 and 58.

Figure 2:
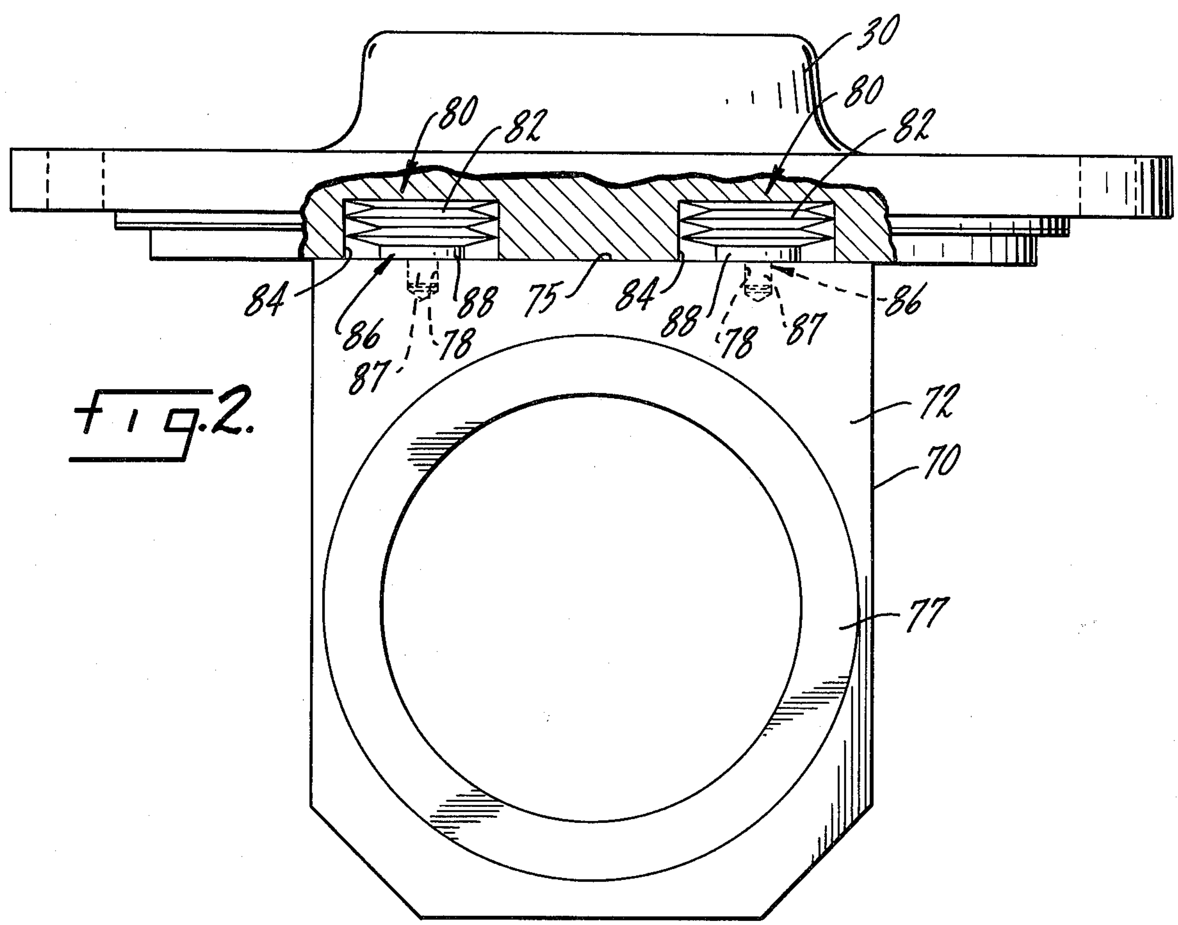
FIG. 2 is a side elevational view of the seat ring and bonnet assembly with a portion broken away and the body removed for clarity.

Referring to FIGS. 1 and 2, a seat ring adjustment means, in accordance with the present invention, is indicated generally at 80. Adjustment means 80 includes a plurality of spring means 82 which are received within cavities 84 in bonnet 30. Spring means 82 are preferably Belleville washer sets, the construction of which is well known in the art. Spring means 82 are positioned in vertical alignment with corresponding rest buttons 86 received in the top surfaces 75 of outer rings 70. Rest buttons 86 include stem portions 87, which are received within cavities 78 in the top surfaces 75, and flat load receiving portions 88 which contact the lower ends of the spring means 82. In the preferred embodiment, each seat ring 20 and 22 has a pair of spring means 82 and rest buttons 86 associated therewith near the outer edges thereof to maintain a downward force of sufficient magnitude to keep the ball 15, seat rings 20 and 22, and seat ring retainers 25 and 27 in tight engagement.

Figure 3:
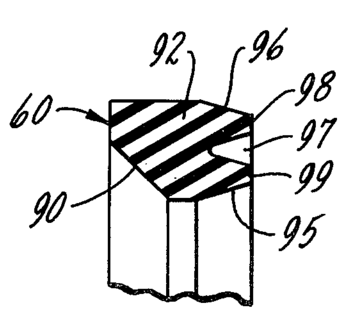
FIG. 3 is an enlarged sectional view of the inner sealing ring.
Figure 4:
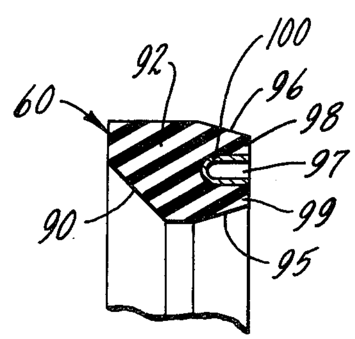
FIG. 4 is an enlarged sectional view of an alternative embodiment of the inner sealing ring.

Referring to FIGS. 1 and 3, inner sealing rings 60 are uniquely designed, in accordance with the present invention, to provide a "spring action" that tends to keep the ball 15 and seats 20 and 22 in tight engagement. Sealing rings 60 are formed with an inner sealing surface 90 for contact with ball 15 and an outer portion 92, having a slotted and tapered cross section, which is received in recess 74. Recess 74 has tapered inner and outer surfaces 93 and 94 which wedgeably receive the tapered inner and outer surfaces 95 and 96 of sealing ring portion 92. An annular slot 97 is formed in the portion 92 to define leg portions 98 and 99 which are compressed towards each other as the sealing ring 60 is wedged into the recess 74. In this preloaded condition, the legs 98 and 99 will tend to force the sealing surface 90 out of the recess 74 and into tighter contact against the ball 15. A secondary spring 100 may be inserted into slot 97, as seen in FIG. 4, to provide a stiffer and more durable or lasting spring action.

In addition to the above, an air pocket 102 is formed within recess 74 between the outer surfaces of legs 98 and 99 and the inner surfaces of the outer ring 70, which also serves to force the sealing ring 60 into tighter contact against the ball 15. As pressure is applied to the sealing ring 60 by the ball 15, the air within pocket 102 is compressed. When the pressure is removed or decreased, the compressed air expands and causes the sealing ring 60 to remain in contact with the ball 15.

Referring to FIG. 1, a combination drain plug and ball extractor assembly is indicated generally at 110. Assembly 110 includes a drain plug 112 which is threadedly received within an opening 114 in body 11 immediately below ball 15. Plug 112 has a "T" shape cavity 116 formed integrally through an upper portion 118 thereof in facing relationship to ball 15. A "T" shaped extractor pin 120, having a base portion 122 and a stem portion 124, is received within cavity 116. Pin 120 has a storage or upright position, as seen in solid lines in FIG. 1, and an extracting or inverted position, as seen in phantom lines in FIG. 1. When in its extracting position, base portion 122 is received within cavity 116 and stem portion 124 extends into central space 14 and is received within a cavity 125 in ball 15. With the bonnet 30 removed, the drain plug may be threaded into body 11 to jack ball 15 free from its wedged position and permit removal thereof from the body 11. When in its storage position, there is clearance between ball 15 and pin 120.

To assemble the valve, an assembled unit, consisting of ball 15, seat retainer 70, and seat rings 20 and 22, is assembled outside the valve body. The rest buttons 86 are positioned within cavities 78. The assembled unit is then inserted through lateral opening 28 into central space 14. As shown in FIG. 1, the assembled unit is wedgeably received between seat ring retainers 25 and 27. To complete the valve assembly, the bonnet 30, having the stem 40 secured thereto and the spring means 82 positioned within cavities 84, is secured to body 11 by cap screws 31.

Spring means 82 maintains a downward force of sufficient magnitude on the seat rings 20 and 22 to retain ball 15, inner sealing rings 60, outer retaining rings 70, and body 11 in fluid tight engagement. The cooperation between the legs 98 and 99 of inner sealing ring 60 and the tapered recess 74 in outer retaining rings 70 further tends to keep the ball 15 and seat rings 20 and 22 in tight engagement. The spring means 82 in combination with the unique design of seat rings 20 and 22 automatically compensates for the following: variation in manufacturing tolerances; seat wear; lack of, or subsequent loss of, resiliency of the seat material; and excessive seat deformation caused by an accidental over pressure and/or over temperature application.

The entire assembly force may be either applied through the spring means 82 themselves or the springs may be compressed a predetermined amount before a metal-to-metal contact is established and the final assembly forces applied. The present invention requires only a relatively low spring force due to the large mechanical advantage of the inclined surfaces 57 and 58. It should also be noted that the flexible legs 98 and 99 contact the outer rings 70 while the ball contacts a relatively inflexible and blunt surface 90 of seat ring 60.

If replacement of the seat rings 20 and 22 becomes necessary, the bonnet 30 is removed from body 11. The drain plug 112 is removed and the pin 120 is placed in its extracting position, as shown in phantom lines in FIG. 1. The drain plug 112 is then threaded into opening 114 which causes stem 124 to contact ball 15 so as to jack the ball free from its wedged position. With the ball 15 and seat retainer 70 containing seat rings 20 and 22 now broken free, the ball 15, seat retainer 70, and seat rings 20 and 22 may be drawn out through opening 28. After the seat rings have been replaced, the assembled unit is returned to the body in the manner as in originally assembling the valve. This repair can be performed without disconnecting the body from the pipe line.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A ball valve comprising:

a. a body having two longitudinally aligned fluid passages and a lateral opening communicating with a central space;

b. a rotatable ball positioned within said central space and having an opening therethrough communicable with said fluid passages;

c. seat ring means positioned against and clampingly securing said ball therebetween;

d. bonnet means secured to said body in covering relationship to said seat ring means and said ball;

e. a rotatable valve stem, projecting through said lateral opening and said bonnet means, connected to said ball for rotating said ball between positions, permitting and preventing the passage of fluid therethrough;

f. said seat ring means including an outer retaining ring and an inner sealing ring received within a tapered annular recess in said outer retaining ring, said inner sealing ring having a sealing surface positioned to contact said ball and an outer portion of tapered cross section wedged into said tapered annular recess, said outer portion having an annular slot formed integrally therein to define a pair of leg portions which are compressed towards each other as said outer portion is wedged into said annular recess so as to force said inner sealing ring out of said annular recess into tighter contact against said ball; and g. spring means disposed within said annular slot to provide a stiffer spring action to said leg portions.

2. A ball valve comprising:

a. a body having two longitudinally aligned fluid passages and a lateral opening communicating with a central space;

b. a rotatable ball positioned within said central space and having an opening therethrough communicable with said fluid passages;

c. seat ring means positioned against and clampingly securing said ball therebetween;

d. bonnet means secured to said body in covering relationship to said seat ring means and said ball;

e. A rotatable valve stem, projecting through said lateral opening and said bonnet means, connected to said ball for rotating said ball between positions permitting and preventing the passage of fluid therethrough; and f. drain plug means threadedly received within an opening formed in said body directly below said ball, said drain plug means having a cavity formed therein in facing relationship to said ball for support of an extractor pin therein, said extractor pin being effective to lift said ball free from its clamped position upon the upward movement of said drain plug means within said opening in said body.

3. The invention as defined in claim 2 wherein said extractor pin and said cavity are of "T" shape, said extractor pin having a storage position substantially confined within said cavity and an inverted ejecting position with a portion extending upward from said cavity for contact with said ball.

* * * * *